J. PARCO.
TRANSMISSION.
APPLICATION FILED JULY 5, 1921.

1,425,214.

Patented Aug. 8, 1922.
5 SHEETS—SHEET 1.

INVENTOR.
John Parco.
BY
ATTORNEY

UNITED STATES PATENT OFFICE.

JOHN PARCO, OF JAMESTOWN, CALIFORNIA.

TRANSMISSION.

1,425,214.  Specification of Letters Patent.  Patented Aug. 8, 1922.

Application filed July 5, 1921. Serial No. 482,412.

*To all whom it may concern:*

Be it known that I, JOHN PARCO, a citizen of the United States, residing at Jamestown, county of Tuolumne, State of California, have invented certain new and useful Improvements in Transmissions; and I do declare the following to be a full, clear, and exact description of the same, reference being had to the accompanying drawings, and to the characters of reference marked thereon, which form a part of this application.

This invention relates to improvements in transmission mechanisms and gearings for use with internal combustion engines as employed on motor vehicles to transmit the driving power of the engine in various ratios of speed and direction of rotation to the driven shaft or axle.

In my improved form of mechanism, the gears are always in mesh and do not slide into contact with one another, thus doing away with the clashing and frequent stripping of the gear teeth which is a common occurrence with the standard types of transmission in use today. At the same time however only those gears which are actually in use rotate at the time, and to provide means for accomplishing this end forms a main object of my invention.

A further and important object is to provide a single operating rod for all the gears, one one end of which is a handle which may be placed adjacent to or on the steering post of the vehicle, thus doing away with the inconvenient lever now projecting up through the floor of the car.

Another object is to provide a compressed air means for actually shifting the gears, which means is controlled by a movement of the rod-handle to any predetermined position, so that nearly all physical effort needed to shift gears is eliminated.

A still further object is to provide means for controlling the air, operated in conjunction with the engine clutch, for placing any gear automatically in neutral position when the clutch is thrown out, and for likewise preventing the operative movement of any gear until the clutch is thrown.

These objects I accomplish by means of such structure and relative arrangement of parts as will fully appear by a perusal of the following specification and claims.

In the drawings similar characters of reference indicate corresponding parts in the several views.

Fig. 1ª is a side elevation of the complete device, installed on an automobile.

Fig. 5 is a fragmentary top plan view of the operating rod and shift-fork sleeves, showing the clutch released means for holding them against undesired movement.

Fig. 16 is a detached view of a friction-sleeve.

Figures 1, 2:
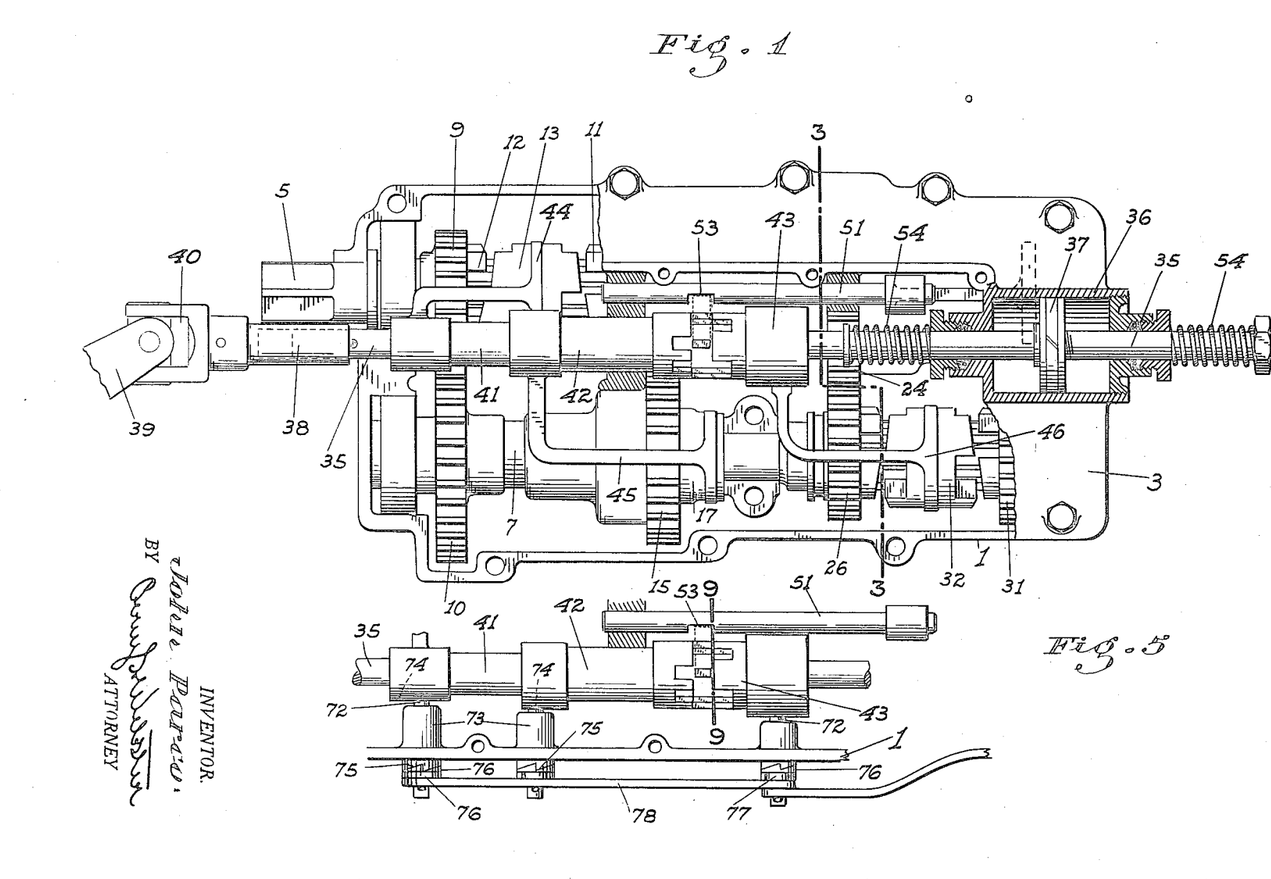
Fig. 1 is a top plan view, partly in section, of my transmission, with the upper portion of the enclosing casing removed.
Fig. 2 is a longitudinal plan-section, taken through the driving, driven, and jackshafts.
Figure 1A:
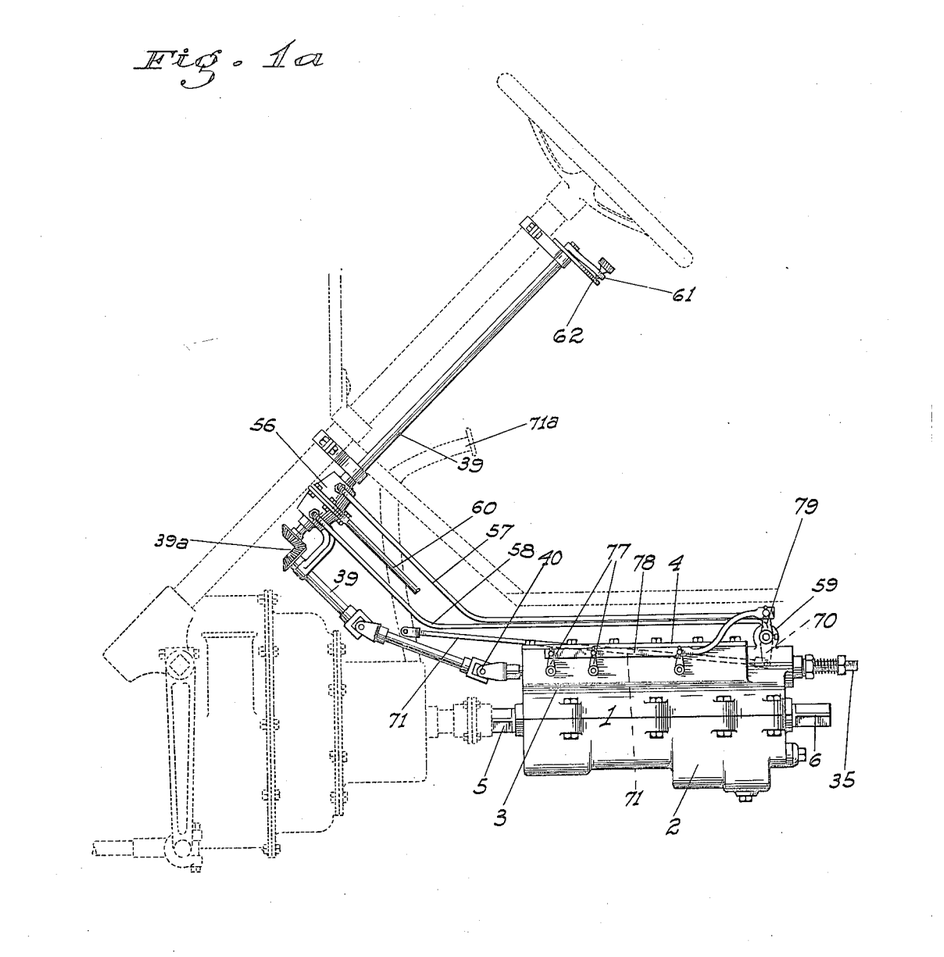
Figures 3, 4, 13, 14, 15:
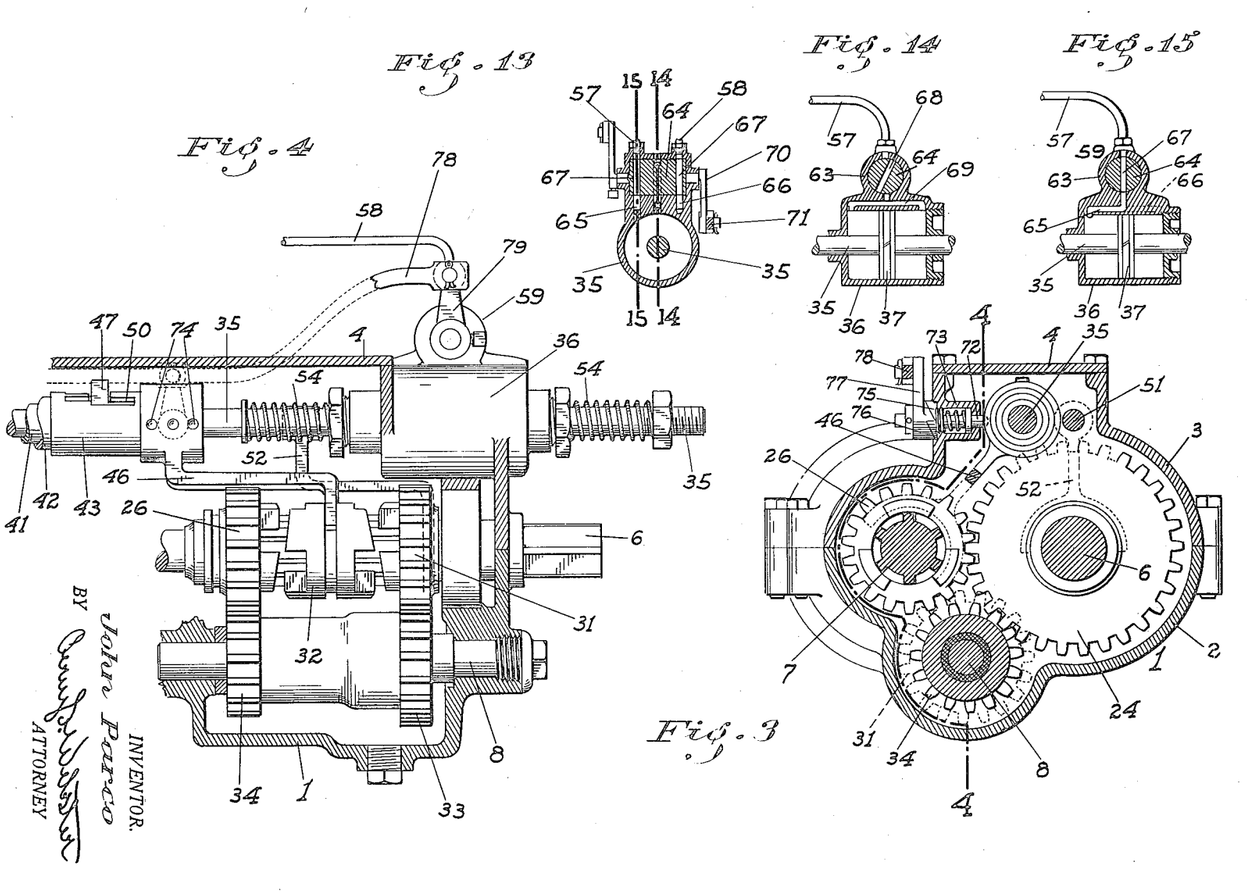
Fig. 3 is a cross section taken substantially on a line 3—3 of Fig. 1.
Fig. 4 is a partial longitudinal section taken on a line 4—4 of Fig. 3.
Fig. 13 is a cross view through the air cylinder and the clutch-controlled air-valve.
Fig. 14 is a sectional view taken on a line 14—14 of Fig. 13.
Fig. 15 is a similar view taken on a line 15—15 of Fig. 13.
Figure 6:
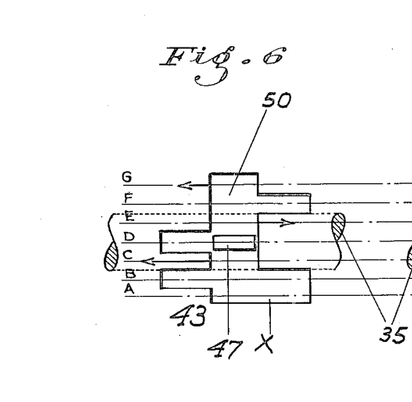
Fig. 6 is a diagrammatic plan of the operating rod and the movement controlling pin, and the slot in the shift-fork sleeve which controls the low and reverse-gear positions.
Figure 7:
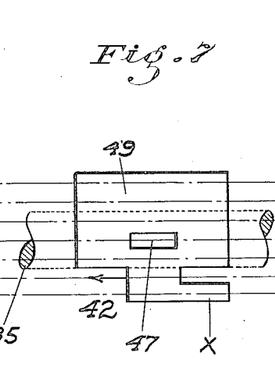
Fig. 7 is a similar view, showing the slot in the intermediate-control sleeve.

Referring now more particularly to the characters of reference on the drawings, the numeral 1 denotes in general the casing in which the mechanism is mounted, preferably made in three parts for ease of manufacture, as for instance a lower portion 2, an upper portion 3, and removable cover 4 (see Fig. 3). For convenience of description however, these members will in the main be referred to hereinafter as "the casing."

Journaled in the casing is the drive shaft 5, adapted to be connected to the motive power, and independent thereof but in continuous alinement therewith the driven shaft 6, adapted to be connected to the driven wheels or other members.

Also journaled in the casing parallel to the shafts 5 and 6 is the jackshaft 7, preferably in horizontal and spaced alinement relative thereto, while under and intermediate said shafts 6 and 7 is the reverse-gear shaft 8, likewise journaled in the casing.

Turnably mounted on the shaft 5 is a gear 9 constantly meshing with a gear 10 keyed on the shaft 7. The end of the shaft 6 adjacent the shaft 5 is provided with clutch teeth 11, facing but spaced from similar teeth 12 on the gear 9. Slidably splined on the shaft 5 intermediate said teeth and adapted to engage either set at a time, or to be placed free therebetween is a double jaw-clutch member 13, moved as will be hereinafter shown.

Turnably mounted on the shaft 6 beyond the clutch teeth thereon is a gear 14, meshing constantly with a gear 15 turnably mounted on the shaft 7. The gear 15 is provided with clutch teeth or jaws 16 adapted to be engaged by a clutch member 17 splined on the shaft 7.

The gear 14 is provided with an exteriorly threaded hub 18, on which is threaded a taper or cone sleeve 19 adapted to engage a surrounding cone surface 20 in a sleeve or collar 21 keyed onto the shaft 6.

The purpose of this construction is so that when the gear 14 is rotated in a predetermined direction, the cone 19 will be moved along the threads of the hub to frictionally engage the member 21 causing the latter, and hence the shaft 6, to rotate with said gear.

When the gear 15 is held idle, with the shaft 6 still rotating faster than the gear 14, the direction of movement of the cone 19 on the hub 18 will be reversed, and the cone will be disengaged from the member 21, thus freeing the gear from the shaft.

Freedom of movement of the cone independent of the hub is limited by means of a stop such as a ball 22 partially seated in the hub and projecting into a peripheral slot 23 of predetermined length in the cone 19. In this manner, possible jamming or undue wedging is avoided.

This friction clutch structure is a form of one-way of what is known as an overrunning clutch, which grips a shaft only when the speed of the member in which the clutch is positioned exceeds that of the driven shaft, when rotating in the same direction. The difference in this structure however from the usual type of such clutches is that a reverse movement of the shaft will not cause the clutch to grip.

Turnably mounted on the shaft 6 at the opposite end of the member 21 is a gear 24 having a clutch structure 25 co-operating with the sleeve 21 of identical construction as that between the gear 14 and said member 21, and operating to turn the latter with the same direction of rotation of the gear. This gear 24 meshes constantly with a gear 26 slidably mounted on the shaft 7.

Splined on the shaft 6 beyond the gear 24 is a clutch member 27 adapted to engage the gear 24.

Splined on the member 27 is a sleeve 28 similar to the sleeve 21, the gear 24 on the side thereof next said sleeve having a clutch structure 29 co-operating therewith of the same construction as the clutch 25, but operating to turn the sleeve 28 and shaft 6 only with a rotation of the gear in the reverse direction from that with which the clutch 25 becomes operative.

A spring 30 on the sleeve 27 normally acts to force the same away from the gear 24.

On the shaft 7 beyond the gear 26 is turnably mounted a gear 31, between which gears is a double clutch member 32 splined on the shaft and adapted to engage either one at a time of the gears, or to lie free therebetween.

The gear 31 meshes constantly with a gear 33 on the reverse-shaft 8, while another gear 34 on said shaft and turnable with the gear 33, meshes constantly with the gear 24, but not with the gear 26.

The gears 9 and 10 control the general rotation of the jackshaft, the clutch 13 moved into engagement with the teeth on the shaft 6 gives the high speed or direct drive, the gears 14 and 15 give the intermediate or second speed; the gears 24 and 26 give the low speed, and the gears 31, 33, 34 and 24 control the reverse movement to the shaft 6; the various gears being proportioned according to the speed ratios desired.

The various clutches 13, 17 and 32 are shifted into engagement with their respective gears, etc., by the following means:—

Positioned above and intermediate the shafts 5, 6 and 7, and parallel thereto, is a shift-control rod 35 journaled in the casing both for turning and longitudinal movement. Adjacent one end this rod passes through an enclosed cylinder 36, on which rod inside the cylinder is a piston 37. The other end of the rod projects through the casing to a slip-joint connection 38 with an operating rod 39 preferably having a universal joint 40 interposed therein, besides bevel gearing 39ª if necessary so that said rod 39 may be positioned at any reasonable angle to the rod 35, in order that it may terminate at its upper end at some point within convenient reach of the driver of the car, as for instance alongside and secured to the steering post.

Slidably and turnably mounted on the rod 35 in superimposed order are three sleeves 41, 42, and 43 respectively, each outer sleeve being shorter than the adjacent inner one. On the sleeve 41 is rigidly fixed a fork 44, operatively connected to the clutch 13, on the sleeve 42 is a fork 45 extending to the clutch 17; and on the sleeve 43 is a fork 46 leading to the clutch 32.

On the rod 35 and projecting radially through all the sleeves and therebeyond is a rigid pin 47, the sleeves 41, 42 and 43 being provided with peculiarly and differently shaped slots 48, 49 and 50 respectively, for a purpose which will be hereinafter seen.

Positioned on one side of the rod 35 and preferably in vertical alinement with the shaft 6 is another rod 51 having a fork 52 leading to the clutch 27 and provided with a groove 53 in alinement with the pin 47 when the latter is in neutral position, this position being when the piston 37 is midway of the cylinder 36, this position being normally maintained by means of counteracting springs 54 on each side of the cylinder.

The pin 47 is adapted to enter the groove 53 when desired, for a purpose as will appear.

The movements to be effected to get the different speeds are these:—For a neutral position, the clutches are all disengaged from their respective gears, so that they have no rotation imparted thereto. For high or direct speed, the clutch 13 must be moved to the right. For low speed, the clutches 13 and 32 must be moved to the left. For intermediate or second speed, the clutches 13 and 17 must be moved to the left, while for reverse the clutch 13 must be moved to the left while the clutch 32 is moved to the right.

The clutch 27 is moved to the left to engage the gear 24 while at the same time the clutches 13 and 32 are also moved to the left. This is what I call the emergency or safety feature of the device, the object being to place the transmission in low when the engine has stalled on a grade and no holding back movement can be imparted to the shaft 6 from the engine shaft 5, since the latter as stated, is then idle.

The shaft 6 however, turning with the movement of the car, by causing the gears 24, 26 and 9 to turn with their respective shafts, the engine shaft 5 is forced to turn against the compression of the engine, with the well-known holding back or braking effect.

To set the pin 47 to insure movement of the sleeves to shift the respective clutches, and at the same time to provide for longitudinal movement of the rod 35 and pin 47 to move the sleeves, I preferably make use of compressed air in the following manner:

Interposed in the rod 39 and turnable therewith is an air-valve member 55 completely enclosed in a casing 56, in which said valve is turnable.

A pipe 57 leads from one end of the casing to the forward end of the cylinder 36, while another pipe 58 at the other end of the casing leads to the opposite end of the cylinder, through an engine-clutch controlled valve 59 mounted on the latter and described in detail hereinafter.

An air supply pipe 60 is also connected to the casing 56, and communicates with the valve 55 at all times, the latter being hollow.

In order to provide for the shifting of the gears for all speeds and purposes, seven rotative positions of the rods 35 and 39, acting in unison, are necessary. I therefore provide the rod 39 with a handle 61 at its upper end, adapted to engage a fixed quadrant 62, provided with seven points of setting in the following order:—high, low, intermediate, gear 9 in for reverse, reverse, gear 9 out after reverse, and emergency, represented by A, B, C, D, E, F and G respectively.

When the handle 61 registers with the point A, the valve 55 is rotated to cause a port H in the valve to register with the pipe 57, so that air may pass therethrough to act against the piston 37 and move the rod 35 to the rear. When the handle 61 is moved to the point B, the port H is moved out of register with the pipe 57, and a port J at the other end of the valve registers with the pipe 58, admitting air to the opposite end of the cylinder, and tending to cause a movement of the rod 35 forwardly, or toward the engine shaft end of the casing 1. Similarly a further movement of the handle 61 to the points C and D causes ports K and L in the valve to register with the pipe 58, tending to move the rod 35 forwardly. Following these movements, rotation of the handle 61 to aline with points E and F causes ports M and N respectively in the valve 55 to register one at a time with the pipe 57, while the ports K, L etc. at the opposite end of the valve are then shut off from the pipe 58.

The last movement of the handle to the point G causes a port P in the valve 55 to register with pipe 58, while all ports at the other end are out of register with the pipe 57. Thus with the rotation of the handle 61 to the various settling points the admission of air to the cylinder is controlled to cause the rod 35 to move in one direction for four settings, and to the rear for the remaining three.

Admission of the air to the cylinder is controlled by the movement of the engine-clutch in the following manner:

The valve 59 comprises a casing 63 preferably formed with the cylinder 36, and a rotatable member 64 therein.

The pipes 57 and 58 lead to opposite ends of the casing 63, while ports 65, and 66 lead from said casing in vertical alinement with said pipes to the front and rear ends of the cylinder respectively.

Ports 67 in the member 64 are adapted to simultaneously open communication between the pipes 57 and 58 and their respective leads into the cylinder, while an intermediate and offset port 68 in said valve member is adapted to open communication with the atmosphere from both ends of said cylinder at once by means of a branched exhaust port 69, such communication however being established only when the ports 67 do not register with the air-pipes, and vice versa.

An arm 70 is fixed on one end of the valve member 64, to which is connected an arm 71 leading to and connected to the common engine-clutch pedal 71$^a$ in such a manner that when the clutch is thrown in, the ports 67 aline with the respective air pipes, allowing the air which is in either pipe, as determined by the setting of the valve 55, to enter the corresponding end of the cylinder, while when the clutch is thrown out, the valve 64 is moved to aline the port 68 with the exhaust port 69, allowing the air to escape.

It will thus be seen that to operate the transmission, the desired speed-setting is first obtained by moving the handle 61 and parts connected thereto, and the clutch, if already out, is then thrown in, causing, by reason of the air entering the cylinder, almost instantaneous movement of the rod and consequent shifting of such gear as may be desired. If the clutch is in when a change of gear is desired, the clutch must first be thrown out, which releases the air in the cylinder and causes the rod 35 and piston to return to a normal neutral position by reason of the springs 54. The new setting of the handle 61 may then be made, and the clutch again thrown in.

The movement of any of the sleeves by the pin 47 with the movement of the rod 35 to shift any gears is had by means of the slots 48, 49 and 50 therein, which I term the selective slots.

For instance, suppose the pin 47 to be in neutral and it is desired to throw in high gear. The handle A is moved to register with the "A" point on the quadrant, simultaneously alining the valve port H with the pipe 57, admitting air to the front end of the cylinder, and also moving the pin 47 to the extreme left of all the slots 48, 49 and 50. It is only desired however to move the sleeve 41 to the right, and hence the slot therein at this point is only wide enough to accommodate the pin.

The slots 49 and 50 however in the remaining sleeves are formed with sufficient longitudinal clearance, as shown at X, to prevent movement of said latter sleeves. The sleeve 41 therefore is forced to the right by reason of the pin 47 abutting against the wall of the slot, throwing the clutch 13 into engagement with the shaft 6. As long as the clutch is thrown in the air pressure in the cylinder, which is constant, holds the rod and piston to the right, as soon as the clutch is thrown out however and the air exhausted as previously set forth, the rod 35 returns to normal neutral position by reason of the springs 54, bringing the sleeve 41 back to normal position also, automatically disengaging the clutch 13.

To shift the gears to intermediate, the next position to the right or in a clock-wise direction, both the sleeve 41 and the sleeve 42 must move in unison, but to the left, in order to throw both the gear 9 and the gear 15 into engagement with their respective shafts. The contour of the slots 48 and 50 then is such as to cause the pin 47 to shift both said sleeves, leaving the sleeve 43 inactive on account of the clearance shape of the slot therein, and to cause said sleeves to be both returned to neutral position when the springs 54 are free to act.

For low, the next position, the sleeves 41 and 43 are moved to the left and in the same manner.

For emergency, the last setting to the right, the sleeves 41 and 43 are moved to the left, together with the rod 51, by reason of the pin 47 then engaging the slot 53 in said rod.

For reversing, a somewhat longer procedure must be followed, but as reversing is not usually only done when backing out after parking, etc., I do not feel that this is an obstacle to the success of my device.

The difficulty encountered lies in the fact that the clutch 13 must move to the left while the clutch 32 moves to the right.

I therefore operate the reverse-shift in the following manner:—The handle 61 is first moved to the point D on the quadrant. This turns the rod 35 to position the pin 47 to move the sleeve 41 only, and to the left, when the engine clutch is thrown in. This clutch must then be released, bringing the pin 47 back to neutral, but leaving the sleeve 41 behind, owing to the extra length given to the slot 41 in this plane, as at Y. Also for this movement, the sleeves 49 and 50 are idle, their slots being formed so as not to interfere with the pin.

Figure 8:
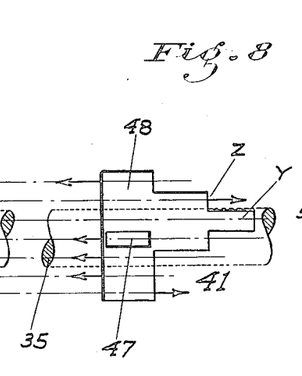
Fig. 8 is a similar view, showing the slot in the sleeve which controls the high speed and the gear used in connection with the other change-speed gears.
Figure 9:
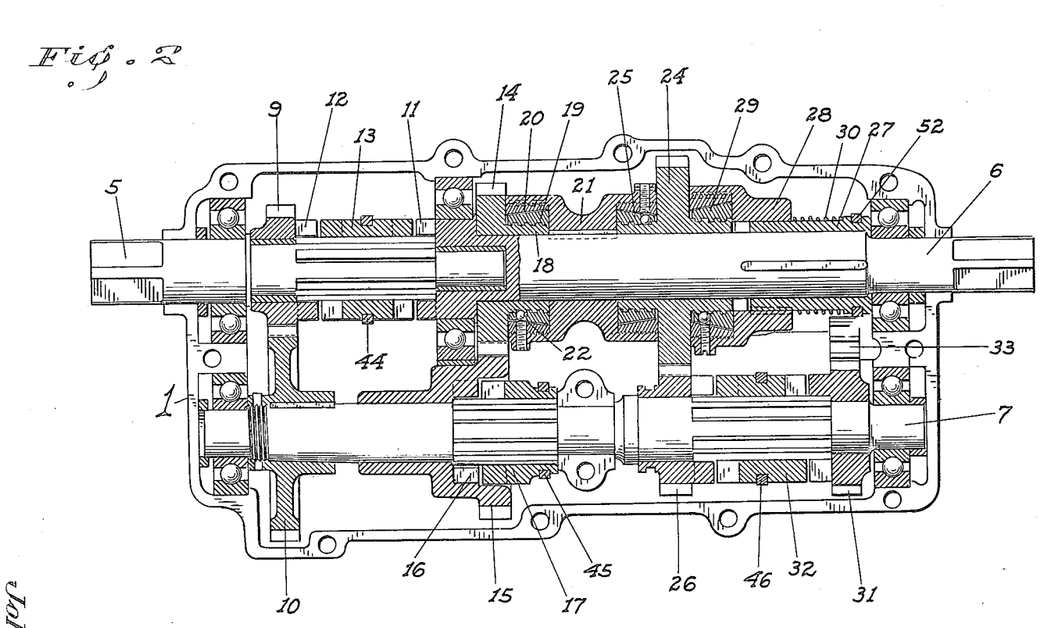
Fig. 9 is a sectional view through the operating rod and sleeves, taken on a line 9—9 of Fig. 5.
Figure 10:
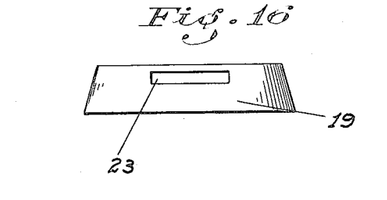
Fig. 10 is a longitudinal section of a hand-actuated air-valve for controlling the different shifts.
Figures 11, 12:
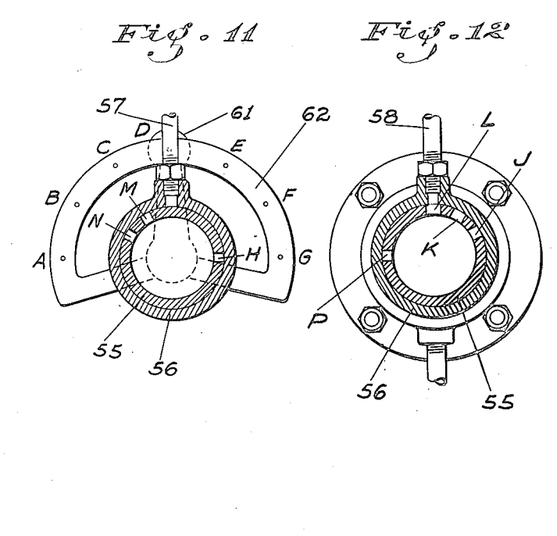
Fig. 11 is a cross section of the valve, taken on a line 11—11 of Fig. 10.
Fig. 12 is a similar view, taken on a line 12—12 of Fig. 10.

When the pin 47 is again back to neutral, as stated, the handle is moved to point E, which causes the pin 47 to engage and shift only the sleeve 43 when the rod 35 moves longitudinally. Owing to the shape of the slot 50 in this plane, the sleeve 43, controlling the clutch 32, will be returned to neutral when the springs 54 act. The clutch 13 is still thrown in however, and to release it, the handle is moved to the F position, thereby causing the pin 47 to engage the right-hand edge of the slot in the sleeve 41, at the point "Z" in Fig. 8, which sleeve has been already moved to the left with the first operation.

Upon the air acting on the rod 35 to then move the same to the right with this setting of the pin and valve 55, the clutch 13 will be returned to neutral, and the pin 47 will then likewise be in neutral position, ready for another shift.

It will be observed that in the normal neutral position of the sleeves, the central circumferential or arcuate extent of all the slots is the same, allowing the rod 35 to be moved freely to any one of the seven settings, but it cannot be so moved when a sleeve is in a shifted position. Hence to make any shift, the sleeves and pin must first be brought back to neutral, which is automatically accomplished by means of the engine-clutch air release valve and the springs 54.

It will also be noted that while the rods 39 and 35 rotate in unison, the former does not move longitudinally with the latter, owing to the slip-joint 38 therebetween.

I have also provided a means for positively holding each clutch in any predetermined position when once set, in case there should be a leakage of the air pressure from the cylinder tending to allow the piston to move to neutral when this is not desired.

This means comprises spring-pressed pins 72 slidably mounted in bosses 73 in the casing 1, said pins being adapted to engage sockets 74 in the sleeves, there being a pin for each sleeve and as many sockets in each sleeve as there are possible settings thereof. The bosses outside of the casing are provided with cam surfaces 75 engaged by similar surfaced hubs 76 in which the pins are secured, these hubs having arms 77 connected together in common as by rods 78 to an arm 79 on the valve member 64, this arm being so positioned that when the engine-clutch is thrown out and the member 64 rotated, the hubs 77 will be caused to be moved away from the casing, withdrawing the pins from their sockets and allowing the sleeves free movement.

When the clutch is again thrown in, the pins again move inwardly.

From the foregoing description it will be readily seen that I have produced, such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A transmission mechanism including a plurality of change-speed gears, superimposed and longitudinally movable sleeves, means between the sleeves and corresponding gears for effecting different driving relations with the movement of said sleeves, a hand-turned operating rod passing through the sleeves, means controlled by the rotation of said rod for selecting any sleeve desired to be moved, and means for then moving said sleeve.

2. A transmission mechanism including a plurality of change-speed gears, superimposed and longitudinally movable sleeves, means between the sleeves and corresponding gears for effecting different driving relations with the movement of said sleeves, a hand-turned operating rod passing through the sleeves, means controlled by the rotation of said rod for selecting any sleeve desired to be moved, and means acting on the rod for moving the same longitudinally to effect a similar movement of the selected sleeve.

3. A transmission mechanism including a plurality of change-speed gears, superimposed and longitudinally movable sleeves, means between the sleeves and corresponding gears for effecting different driving relations with the movement of said sleeves, means for selecting any sleeve desired to be moved, and means for then moving said selected sleeve longitudinally.

4. A transmission mechanism including a plurality of change-speed gears, superimposed and longitudinally movable sleeves, means between the sleeves and corresponding gears for effecting different driving relations with the movement of said sleeves, means for selecting any sleeve desired to be moved, compressed air means for moving said sleeve longitudinally, locking means for normally holding the sleeves against movement, and a common means for controlling the operation of the air means and for simultaneously unlocking the sleeves.

5. A transmission mechanism including a plurality of change-speed gears, superimposed and longitudinally movable sleeves, means between the sleeves and corresponding gears for effecting different driving relations with the movement of said sleeves, means for selecting any sleeve desired to be moved, compressed air means for moving said sleeve longitudinally, locking means for normally holding the sleeves against movement, a turnable air valve for controlling the admission of air to said sleeve operating means, and means controlled by the rotation of the valve for unlocking the sleeves.

6. A transmission mechanism including a plurality of change-speed gears, superimposed and longitudinally movable sleeves, means between the sleeves and corresponding gears for effecting different driving relations with the movement of said sleeves, means for selecting any sleeve desired to be moved, compressed air means for moving said sleeve longitudinally, locking means for normally holding the sleeves against movement, a turnable air valve for controlling the admission of air to said sleeve operating means, means connected with the clutch pedal of an engine for rotating the valve, and means connected to said turnable valve for unlocking the sleeves with the turning of said valve.

7. In a transmission mechanism having a plurality of change-speed gears, compressed-air shifting means for said gears, hand actuated means for selecting any shift, and means controlled by the movement of the engine-clutch for holding the air-shift means inoperative until said clutch is thrown in.

8. In a transmission mechanism having a plurality of change-speed gears, compressed-air shifting means for said gears, hand actuated means for selecting any shift, and means controlled by the movement of the engine-clutch for holding the air-shift means inoperative until said clutch is thrown in and for causing said means to throw the gears in neutral position when the said clutch is thrown out.

9. A transmission mechanism comprising a plurality of shafts, variable-speed gearing on the shafts arranged in co-operative pairs and constantly in mesh, and turnable on said shafts, clutches splined on the shafts and adapted to engage with respective gears, a hand turned operating rod, superimposed and longitudinally movable sleeves on said rod each having a clutch engaging fork thereon, means controlled by the rotation of said rod for selecting any of said sleeves desired to be moved, and compressed air means for then moving the rod longitudinally to effect a similar movement of the selected sleeve.

10. A transmission mechanism comprising a plurality of shafts, variable-speed gearing on the shafts arranged in co-operative pairs and constantly in mesh, and turnable on said shafts, clutches splined on the shafts and adapted to engage with respective gears, a hand turned operating rod superimposed and longitudinally movable sleeves on said rod each having a clutch engaging fork thereon, selective slots provided in the sleeves and substantially in superimposed alinement, a pin on the rod projecting through said slots, the latter being shaped to allow movement to only certain at a time of said sleeves by the longitudinal movement of the rod with any predetermined rotative setting of said rod, and means for moving said rod longitudinally.

11. A transmission mechanism comprising a plurality of shafts, variable-speed gearing on the shafts arranged in co-operative pairs and constantly in mesh, and turnable on said shafts, clutches splined on the shafts and adapted to engage with respective gears, a hand turned operating rod, superimposed and longitudinally movable sleeves on said rod each having a clutch engaging fork thereon and compressed air means for moving said rod longitudinally after a rotative setting thereof is had.

12. A transmission mechanism comprising a plurality of shafts, variable-speed gearing on the shafts arranged in co-operative pairs and constantly in mesh, and turnable on said shafts, clutches splined on the shafts and adapted to engage with respective gears, a hand turned operating rod superimposed and longitudinally movable sleeves on said rod each having a clutch engaging fork thereon, means controlled by the rotation of said rod for selecting any of said sleeves desired to be moved, certain of said clutches and sleeves being movable in alternate directions to effect different speed-changes, hand controlled means for making any shift-selection and compressed air means controlled by the operation of said control means for moving the selected sleeves to move in a predetermined direction.

13. A transmission mechanism comprising a plurality of shafts, variable-speed gearing on the shafts and arranged in co-operative pairs and constantly in mesh, and turnable on said shafts, clutches splined on the shafts and adapted to engage with respective gears, a hand turned operating rod superimposed and longitudinally movable sleeves on said rod each having a clutch engaging fork thereon, means controlled by the rotation of said rod for selecting any of said sleeves desired to be moved, certain of said clutches and sleeves being movable in alternate directions to effect different speed-changes, hand controlled means for making any shift-selection, a cylinder through which the operating rod passes, a piston on said rod in the cylinder, means actuated by the turning of said rod for making any shift-selection and means controlled by said turning movement whereby compressed air may then be admitted to a predetermined end of the cylinder.

14. A transmission mechanism comprising a plurality of shafts, variable-speed gearing on the shafts arranged in co-operative pairs and constantly in mesh, and turnable on said shafts, clutches splined on the shafts and adapted to engage with respective gears, a hand turned operating rod, superimposed and longitudinally movable sleeves on said rod each having a clutch engaging fork thereon, means controlled by the rotation of said rod for selecting any of said sleeves desired to be moved, certain of said clutches and sleeves being movable in alternate directions to effect different speed-changes, hand controlled means for making any shift-selection, a cylinder through which the operating rod passes, a piston on said rod in the cylinder, means actuated by the turning of said rod for making any shift-selection, means controlled by said turning movement whereby compressed air may then be admitted to a predetermined end of the cylinder, and a common means actuated by the movement of the engine clutch for preventing the air from entering the cylinder until said clutch is thrown in and for exhausting said air when the clutch is released.

15. A transmission mechanism including a plurality of change-speed gears, superimposed and longitudinally movable sleeves, means between the sleeves and corresponding gears for effecting different driving relations with the movement of said sleeves, means for selecting any sleeve desired to be moved, compressed air means for moving said sleeve longitudinally, slidable and spring pressed pins normally engaging the outer faces of the sleeves, a turnable air-valve for controlling the admission of air to the sleeve operating means, and means between said turnable valve and connected to all the pins to withdraw them from contact with the sleeves with the turning of the valve.

16. In a transmission mechanism, a plurality of change-speed gears, rotatable and longitudinally movable operating rod, means operatively connected with said rod and gears for shifting any at a time of the latter with the longitudinal movement of said rod, means for making any shift-selection by the turning of said rod, a cylinder through which the rod passes, a piston on said rod in the cylinder, a compressed air supply and means actuated by the turning of the rod when making a selection whereby air may be admitted to a predetermined end of the cylinder to cause a movement of the rod.

17. In a transmission mechanism, a plurality of change-speed gears, a rotatable and longitudinally movable operating rod, means operatively connected with said rod and gears for shifting any at a time of the latter with the longitudinal movement of said rod, means for making any shift selection by the turning of said rod, a cylinder through which the rod passes, a piston on said rod in the cylinder, a compressed air supply, means actuated by the turning of the rod to make a selection whereby air may be admitted to a predetermined end of the cylinder to cause a movement of the rod, and means for preventing such air from entering the cylinder until the engine-clutch is thrown in and for exhausting the air when said clutch is released.

18. In a transmission mechanism, a plurality of change-speed gears, a rotatable and longitudinally movable operating rod, means operatively connected with said rod and gears for shifting any at a time of the latter with the longitudinal movement of said rod, means for making any shift selection by the turning of said rod, a cylinder through which the rod passes, a piston on said rod in the cylinder, a compressed air supply, means actuated by the turning of the rod to make a selection whereby air may be admitted to a predetermined end of the cylinder to cause a movement of the rod, and means for preventing such air from entering the cylinder until the engine-clutch is thrown in and for exhausting the air when said clutch is released and means whereby when the air is thus exhausted the rod will be moved to neutralize the gear-shift previously made.

19. In a transmission mechanism, a plurality of change-speed gears, rotatable and longitudinally movable operating rod, means operatively connected with said rod and gears for shifting any at a time of the latter with the longitudinal movement of said rod, means for making any shift selection by the turning of said rod, a cylinder through which the rod passes, a piston on said rod in the cylinder, a compressed air supply, means actuated by the turning of the rod to make a selection whereby air may be admitted to a predetermined end of the cylinder to cause a movement of the rod, and means for preventing such air from entering the cylinder until the engine-clutch is thrown in and for exhausting the air when said clutch is released and counteracting and equalized springs on said rod at each end of the cylinder.

20. In a transmission mechanism, a plurality of change-speed gears, a rotatable and longitudinally movable operating rod, means operatively connected with said rod and gears for shifting any at a time of the latter with the longitudinal movement of said rod, means for making any shift selection by the turning of said rod, a cylinder through which the rod passes, a piston on said rod in the cylinder, a compressed air supply, means actuated by the turning of the rod to make a selection whereby air may be admitted to a predetermined end of the cylinder to cause a movement of the rod, the air pressure remaining therein after a shift is made, means whereby the rod will be automatically moved to neutralize the shift previously made when the air is exhausted from the cylinder and co-ordinated means for positively exhausting the air and for preventing movement of the rod until such positive exhausting takes place.

21. A transmission mechanism comprising a plurality of shafts, variable-speed gearing on the shafts arranged in co-operative pairs and constantly in mesh, and turnable on said shafts, clutches splined on the shafts and adapted to engage with respective gears, a hand turned operating rod, superimposed and longitudinally movable sleeves on said rod each having a clutch engaging fork thereon, means controlled by the rotation of said rod for selecting any of said sleeves desired to be moved, a cylinder through which the rod passes, a piston on said rod inside the cylinder, means for admitting compressed air to either end of the cylinder as predetermined whereby the rod and a selected sleeve will move to make a gearshift, and means for preventing any retractive movement of the sleeves and rod until the air in the cylinder is positively exhausted.

22. A transmission mechanism comprising a plurality of shafts, variable-speed gearing on the shafts arranged in co-operative pairs and constantly in mesh, and turnable on said shafts, clutches splined on the shafts and adapted to engage with respective gears, a hand turned operating rod, superimposed and longitudinally movable sleeves on said rod each having a clutch engaging fork thereon, means controlled by the rotation of said rod for selecting any of said sleeves desired to be moved, a cylinder through which the rod passes, a piston on said rod inside the cylinder, means for admitting compressed air to either end of the cylinder as predetermined whereby the rod and a selected sleeve will move to make a gear-shift, and means for preventing any retractive movement of the sleeves and rod until the air in the cylinder is positively exhausted and a commonly actuated means for so positively exhausting the air and for simultaneously releasing the sleeves to allow freedom of movement thereof and of the rod.

23. A transmission mechanism comprising variable-speed gearing on the shafts arranged in co-operative pairs and constantly in mesh, and turnable on said shafts, movable means on the shafts for making any predetermined shift, the forceful rotation of the driven shaft being governed by the rotation of the drive shaft, and emergency means for connecting all said shafts in positive locked and driving relation when the drive shaft is idle.

24. A transmission mechanism including a drive shaft, a driven shaft, a jackshaft, constantly meshing gears on the drive and jack shafts, the gear on the former shaft being turnable thereon, a gear on the driven shaft, by which the latter is rotated, a turnably mounted gear on the jack-shaft meshing therewith, clutch members splined on said drive and jack shafts and adapted to be moved to engage their respective gears, and a commonly actuated means for throwing in both clutches simultaneously.

25. A transmission mechanism including a drive shaft, a driven shaft, a jack shaft, constantly meshing gears on the drive and jack shafts, the gear on the former shaft being turnable thereon, a gear on the driven shaft by which the latter is rotated, a turnably mounted gear on the jack shaft meshing therewith, clutch members splined on said drive and jack shafts and adapted to be moved to engage their respective gears, an operating rod, superimposed sleeves thereon, a clutch fork from each sleeve to one of the clutches and means for causing both said sleeves to be moved simultaneously with the longitudinal movement of said rod.

26. A transmission mechanism including a drive shaft, a driven shaft, a jack shaft, constantly meshing gears on the drive and jack shafts the gears on the former shaft being turnable thereon, a gear on the driven shaft by which the latter is rotated, a turnably mounted gear on the jack shaft meshing therewith, a clutch member splined on the drive shaft and adapted to be moved in one direction to engage the gear thereon or to be moved in the other direction to lock directly with the driving shaft, a clutch member on the jack shaft adapted to be moved to engage the gear thereon, and means for moving both clutches simultaneously in the one direction and for leaving the jackshaft clutch idle while moving the drive shaft clutch in the opposite direction.

27. A transmission mechanism including a drive shaft, a driven shaft, a jack shaft, constantly meshing gears on the drive and jack shafts, the gear on the former shaft being turnable thereon, a gear on the driven shaft by which the latter is rotated, a turnably mounted gear on the jack shaft meshing therewith, a clutch member splined on the drive shaft and adapted to be moved in one direction to engage the gear thereon or to be moved in the other direction to lock directly with the driven shaft, a clutch member on the jack shaft adapted to be moved to engage the gear thereon, an operating rod adapted for rotative and longitudinal movement, superimposed sleeves on said rod, one sleeve being connected to the drive shaft clutch and the other to the jack shaft clutch, and means whereby when the rod is rotated to a certain position both sleeves may be moved simultaneously and when said rod is turned to another position only one of said sleeves will be caused to move.

28. A transmission mechanism including a drive shaft, a driven shaft, a jack shaft, constantly meshing gears on the drive and jack shafts, the gear on the former shaft being turnable thereon, a gear on the driven shaft, by which the latter is rotated, a turnably mounted gear on the jack shaft meshing therewith, a clutch member splined on the drive shaft and adapted to be moved in one direction to engage the gear thereon or to be moved in the other direction to lock directly with the driven shaft, a clutch member on the jack shaft adapted to be moved to engage the gear thereon, and common means for moving both clutches simultaneously or only one at a time.

29. A transmission mechanism including a drive shaft, a driven shaft, a jack shaft, constantly meshing gears on the drive and jack shafts, the gear on the former shaft being turnable thereon, a gear on the driven shaft adapted to impart movement to the driven shaft only with the rotation of said gear in one direction, a turnably mounted gear on the jack-shaft, clutch members splined on the drive and jack shafts and adapted to be moved to engage their respective gears, and an independent clutch member on the driven shaft arranged to positively lock the latter with the gear thereon.

30. A transmission mechanism including a drive shaft, a driven shaft, a jack shaft, constantly meshing gears on the drive and jack shafts, the gear on the former shaft being turnable thereon, a gear on the driven shaft, adapted to impart movement to the driven shaft only with the rotation of said gear in one direction, a turnably mounted gear on the jack shaft, clutch members splined on the drive and jack shafts and adapted to be moved to engage their respective gears, a clutch on the driven shaft arranged to lock the latter with the gear thereon and normally held idle, and a common means for simultaneously engaging the first two named clutches while leaving the last named clutch idle, and for also moving said last named clutch in common with the others.

In testimony whereof I affix my signature.

JOHN PARCO.